United States Patent [19]

Chew et al.

[11] Patent Number: 4,995,422

[45] Date of Patent: Feb. 26, 1991

[54] FLOW CONTROL VALVE

[75] Inventors: Timmy L. Chew, Council Bluffs, Iowa; Glen Brand, Omaha, Nebr.

[73] Assignee: Brand Hydraulics Co. Inc., Omaha, Nebr.

[21] Appl. No.: 434,191

[22] Filed: Nov. 13, 1989

[51] Int. Cl.⁵ ............................................. G05D 7/01
[52] U.S. Cl. ..................................... 137/504; 137/904
[58] Field of Search ............... 137/504, 514, 904, 493, 137/493.8; 251/284

[56] References Cited

U.S. PATENT DOCUMENTS

| | | | |
|---|---|---|---|
| 2,198,487 | 4/1940 | Sisk | 137/504 |
| 2,224,216 | 12/1940 | Coberly | 137/504 |
| 2,676,613 | 4/1954 | Baxter | 137/513.3 |
| 2,872,939 | 2/1959 | Terry | 137/504 |
| 2,928,417 | 3/1960 | Buckner et al. | 137/538 |
| 2,984,261 | 5/1961 | Kates | 137/514 |
| 3,027,913 | 4/1962 | Chatham et al. | 137/484.2 |
| 3,122,162 | 2/1964 | Sands | 137/498 |
| 3,277,924 | 10/1966 | Nezworski | 137/503 X |
| 3,339,580 | 9/1967 | Cutler et al. | 137/504 |
| 3,424,196 | 1/1969 | Donner | 137/504 |
| 3,735,777 | 5/1973 | Katzer et al. | 137/514.5 |
| 3,741,241 | 6/1973 | Jackson | 137/504 |
| 3,752,184 | 8/1973 | Griswold | 137/504 |
| 3,872,884 | 3/1975 | Busdiecker et al. | 137/498 |
| 4,030,520 | 6/1977 | Sands | 137/514 X |
| 4,112,959 | 9/1978 | Jaekel | 137/514 X |
| 4,436,111 | 3/1984 | Gold et al. | 137/498 |

OTHER PUBLICATIONS

Manatrol catalog spec. sheet; 11-8-1967, Assy.-Valve, Pressure Compensated Fixed Flow Control.
Gresen Hydraulics catalog spec. sheet-pp. 24-25, no date, Unidirectional Line Check Valves-Line Throttle Valves.

*Primary Examiner*—Stephen M. Hepperle
*Attorney, Agent, or Firm*—Henderson & Sturm

[57] ABSTRACT

A pressure compensated flow control valve including a body member having an axial bore extending to a closed end and a number of radially aligned ports formed near the closed end. A cylindrical spool is disposed within the axial bore and is movable between a controlled flow position where the spool extends over a portion of the radial ports and a reverse flow position where the radial ports are unobstructed. An orifice formed in an end plate of the spool is sized to allow a predetermined flow rate.

10 Claims, 2 Drawing Sheets

FLOW CONTROL VALVE

TECHNICAL FIELD

This invention relates to valves, and more particularly to a pressure compensated flow control valve.

BACKGROUND ART

Known pressure compensated flow control valves are of complicated designs, including valve bodies having intricate interconnecting bores of varying diameters and including numerous component parts. These complicated designs result in high machining and assembly costs and a physically bulky structure.

Those concerned with these and other problems recognize the need for an improved flow control valve.

DISCLOSURE OF THE INVENTION

The present invention provides a pressure compensated flow control valve including a body member having an axial bore extending to a closed end and a number of radially aligned ports formed near the closed end. A cylindrical spool is disposed within the axial bore and is movable between a controlled flow position where the spool extends over a portion of the radial ports and a reverse flow position where the radial ports are unobstructed. An orifice formed in an end plate of the spool is sized to allow a predetermined flow rate.

An object of the present invention is the provision of an improved pressure compensated flow control valve.

Another object is to provide a flow control valve that is uncomplicated in design and inexpensive to manufacture.

A further object of the invention is the provision of a pressure compensated flow control valve that has the general configuration of a standard hydraulic fitting.

Still another object is to provide a flow control valve that combines a valve and fitting in a single unit.

A still further object of the present invention is the provision of a flow control valve that occupies the same space as a standard hydraulic fitting and simplifies the required plumbing of a hydraulic circuit.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
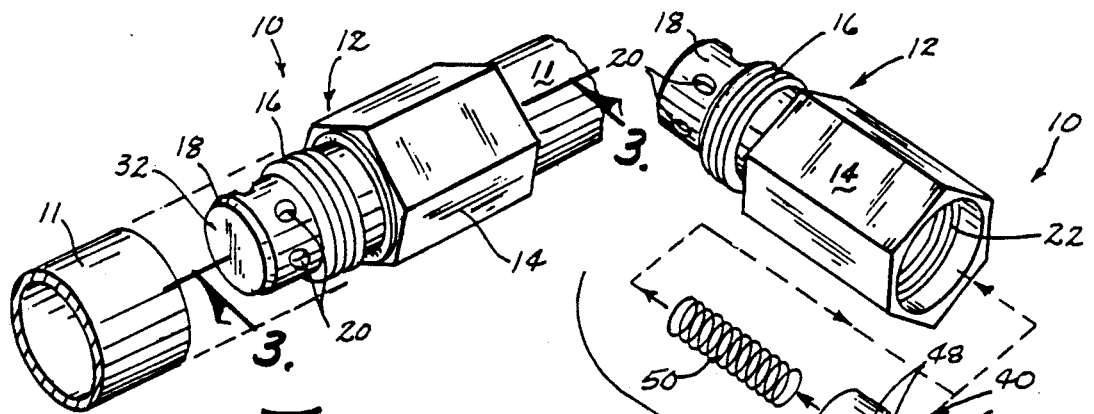
FIG. 1 is a perspective view of the pressure compensated flow control valve of the present invention shown installed in-line with standard hydraulic circuit piping.
Figure 2:
FIG. 2 is an exploded perspective view illustrating the arrangement of the valve components.

Referring now to the drawings, wherein like reference numerals designate identical or corresponding parts throughout the several views, FIG. 1 shows the pressure compensated flow control valve (10) of the present invention installed in-line with standard threaded pipe and fittings (11). As best shown in FIG. 2-6, the valve (10) includes an elongated body member (12) including a hex exterior section (14), an adjacent exterior threaded section (16), and an end section (18) which includes a number of radially aligned ports (20). The interior of the body member (12) includes an interior threaded section (22), an annular recess (24), an enlarged axial bore (26), a tapered bore (28), and an axial bore (30) terminating in a closed end (32).

Figure 3:
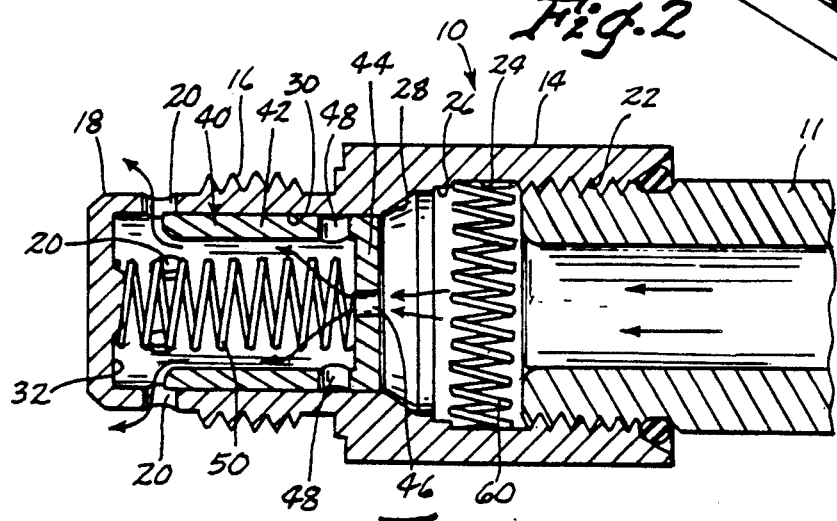
FIG. 3 is an enlarged sectional view taken along line 3—3 of FIG. 1 illustrating the controlled flow of fluid through the orifice in the end plate of the spool and out of the radially aligned ports in the valve body near the closed end.
Figure 4:
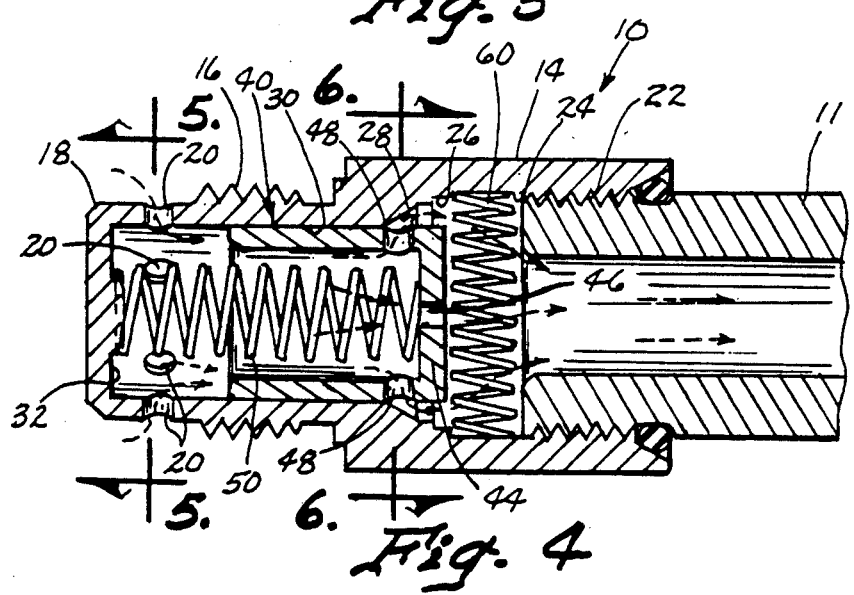
FIG. 4 is a sectional view similar to FIG. 3, but showing the reverse flow of fluid through the radial ports in the valve body and out of the side ports on the valve spool.
Figure 5:
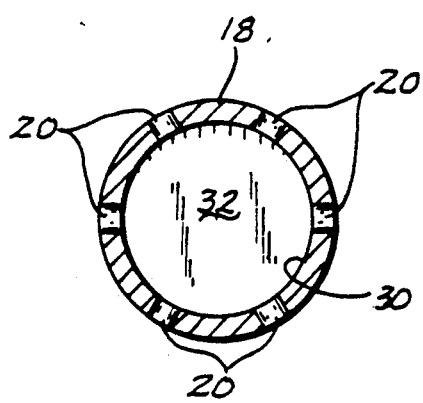
FIG. 5 is a sectional view taken along line 5—5 of FIG. 4 showing the arrangement of the radially aligned ports.
Figure 6:
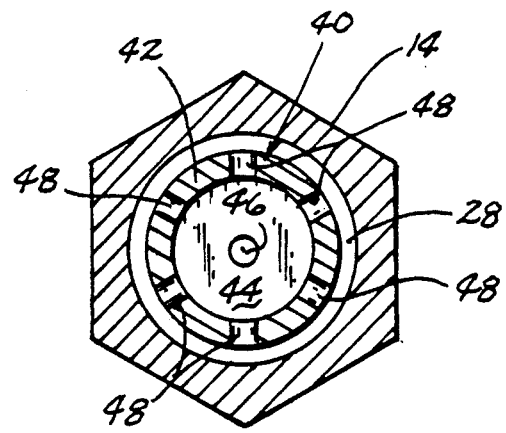
FIG. 6 is a sectional view taken along line 6—6 of FIG. 4 showing the arrangement of the side ports in the valve spool.

A cylindrical spool (40) including an open tubular skirting (42) and an end plate (44) is disposed within the body member (12) such that the skirting (42) is matingly received within the axial bore (30). The spool (40) is movable between a controlled flow position (FIG. 3) and a reverse flow position (FIG. 4). An orifice (46) is formed in the end plate (44) and is sized to allow a predetermined flow rate. A number of side ports (48) are formed in the skirting (42) near the end plate (44). A compression spring (50) is disposed between the closed end (32) and the end plate (44) to bias the spool (40) away from the closed end (32). The free length of compression spring (50) is such that spool (40) can move toward end plate (32) and cover side ports (48) before any spring force is exerted. A stop or spring (60) has opposite ends engaged in portions of the annular recess (24). The stop (60) is disposed to engage the end plate (44) to retain the spool (40) within the axial bore (30).

The operation of the valve (10) is most clearly illustrated by reference to FIGS. 3 and 4. FIG. 3 shows the spool (40) moved to the controlled flow position where the skirting (42) extends over a portion of the radial ports (20) and side ports (48) are covered. The spool (40) is moved toward the closed end (32) by the flow of fluid through the circuit as indicated by the directional arrows. When the spool (40) is in equilibrium, the pressure on the upstream side of the orifice (46) is equal to the pressure on the downstream side, plus the force exerted by the spring (50). When the direction of fluid flow is reversed as shown in FIG. 4, the spool (40) moves toward the stop (60) and fluid flows freely into the radial ports (20) and out of the spool side ports (48) and orifice (46). The combined cross-sectional area of the radial ports (20) is approximately equal to the cross-sectional area of the axial bore (30).

Figure 7:
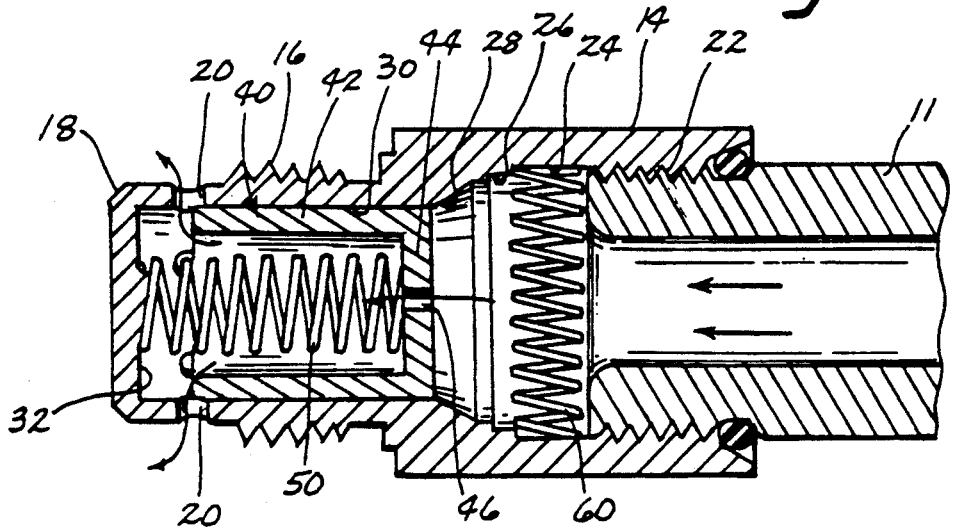
FIG. 7 is a sectional view similar to a FIG. 3, but illustrating an embodiment of the flow control valve where the valve spool does not include side ports.
Figure 8:
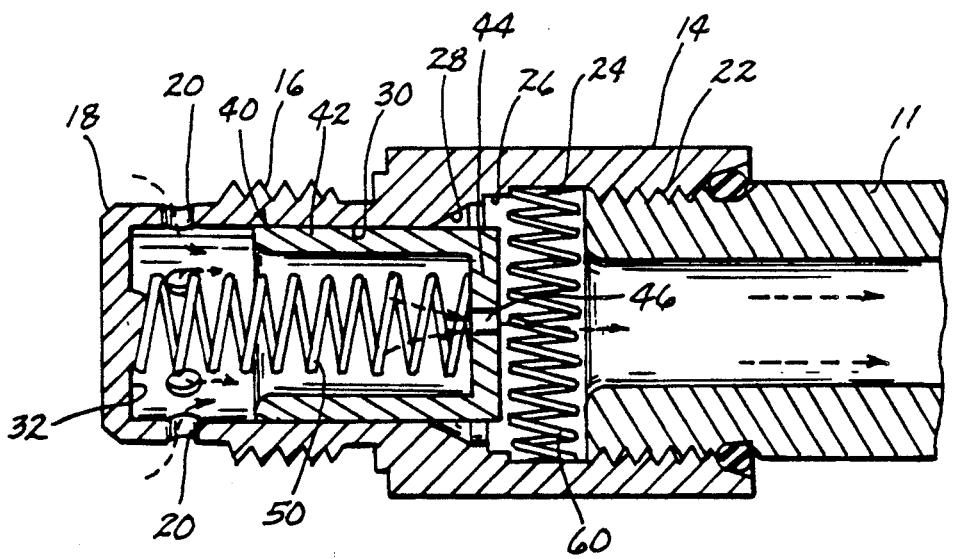
FIG. 8 is a sectional view similar to FIG. 4 illustrating this embodiment.

The operation of the embodiment shown in FIGS. 7 and 8 is similar to that described above except the reverse flow illustrated in FIG. 8 is limited to flow through the orifice (46) and any leakage that may occur between the skirting (42) and the axial bore (30).

The valve body (12) is manufactured from hex stock using a minimum of machining operations. Assembly of the four components is easily accomplished by inserting the compressing spring (50) and the spool (40) into the axial bore (30) and positioning the stop spring (60) into the annular recess (24).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A pressure compensated flow control valve for use in combination with a hydraulic fitting having female threads wherein the flow control valve comprises:
   an elongated body member having an axial bore extending through said body member to a point near a closed end, said body member having a radially aligned port formed therein in the vicinity of said closed end and male threads formed upstream of said radially aligned port wherein said male threads will operatively engage the female threads on said hydraulic fitting;
   a cylindrical spool including an open tubular skirting and an end plate having an orifice sized to allow flow of a fluid at a predetermined flow rate, said skirting being disposed in mating relationship with said axial bore with said end plate being directed away from said closed end, said spool being movable between a controlled flow position wherein the skirting extends over a portion of the radially aligned port and a reverse flow position wherein the radially aligned port is unobstructed;
   means for biasing said spool away from said closed end; and
   means for retaining said spool within the axial bore wherein said retaining means includes a stop attached to said body member and disposed to engage the end plate when said spool is in the reverse flow position and wherein said stop is a compression spring having opposite ends disposed to engage portions of an annular recess formed in said body member.

2. The valve of claim 1 wherein said biasing means includes a compression spring disposed between the closed end of said body member and the end plate of said spool.

3. The valve of claim 1 further including:
   an enlarged axial bore extending from an open end toward the closed end to a point beyond the stop; and
   a side port formed in the spool in the vicinity of the end plate such that the side port is disposed in communication with the enlarged axial bore when the spool is in the reverse flow position.

4. The valve of claim 3 further including a plurality of side ports formed in the spool in the vicinity of the end plate, wherein the combined cross-sectional area of the side ports is approximately equal to the cross-sectional area of the axial bore.

5. The valve of claim 1 further including a plurality of radially aligned ports formed in the body member in the vicinity of the closed end, wherein the combined cross-sectional area of the radially aligned ports is approximately equal to the cross-sectional area of the axial bore.

6. The valve of claim 1 wherein said biasing means includes a compression spring disposed between the closed end of said body member and the end plate of said spool.

7. A pressure compensated flow control valve comprising:
   an elongated body member having an axial bore extending through said body member to a point near a closed end, said body member having a radially aligned port formed therein in the vicinity of said closed end;
   a cylindrical spool including an open tubular skirting and an end plate having an orifice sized to allow flow of a fluid at a predetermined flow rate, said skirting being disposed in mating relationship with said axial bore with said end plate being directed away from said closed end, said spool being movable between a controlled flow position wherein the skirting extends over a portion of the radially aligned port and a reverse flow position wherein the radially aligned port is unobstructed;
   means for biasing said spool away from said closed end; and,
   means for retaining said spool within the axial bore; wherein, said retaining means includes a stop attached to said body member and disposed to engage the end plate when said spool is in the reverse flow position; and, wherein said stop is a compression spring having opposite ends disposed to engage portions of an annular recess formed in said body member.

8. The valve of claim 7 further including:
   an enlarged axial bore extending from an open end toward the closed end to a point beyond the stop; and,
   a side port formed in the spool in the vicinity of the end plate such that the side port is disposed in communication with the enlarged axial bore when the spool is in the reverse flow position.

9. The valve of claim 7 further including a plurality of radially aligned ports formed in the body member in the vicinity of the closed end, wherein the combined cross-sectional area of the radially aligned ports is approximately equal to the cross-sectional area of the axial bore.

10. The valve of claim 9 further including a plurality of side ports formed in the spool in the vicinity of the end plate, wherein the combined cross-sectional area of the side ports is approximately equal to the cross-sectional area of the axial bore.

* * * * *